(12) United States Patent
Nyadong et al.

(10) Patent No.: US 11,988,654 B2
(45) Date of Patent: May 21, 2024

(54) DECREASING THE ADVERSE EFFECTS OF NICKEL AND VANADYL PORPHYRINS IN PETROLEUM REFINING

(71) Applicant: PHILLIPS 66 COMPANY, Houston, TX (US)

(72) Inventors: Leonard Nyadong, Owasso, OK (US); Jose Edgar Mendez Arroyo, Wexford, PA (US)

(73) Assignee: Phillips 66 Company, Houston, TX (US)

( * ) Notice: Subject to any disclaimer, the term of this patent is extended or adjusted under 35 U.S.C. 154(b) by 239 days.

(21) Appl. No.: 17/840,771

(22) Filed: Jun. 15, 2022

(65) Prior Publication Data

US 2023/0011703 A1 Jan. 12, 2023

Related U.S. Application Data

(60) Provisional application No. 63/216,772, filed on Jun. 30, 2021.

(51) Int. Cl.
*G01N 30/72* (2006.01)
*G01N 1/40* (2006.01)

(52) U.S. Cl.
CPC ....... *G01N 30/7266* (2013.01); *G01N 1/4055* (2013.01); *G01N 2001/4061* (2013.01)

(58) Field of Classification Search
CPC ............ G01N 30/7266; G01N 1/4055; G01N 2001/4061; G01N 30/8686; G01N 2030/8854; C10G 21/003
See application file for complete search history.

(56) References Cited

U.S. PATENT DOCUMENTS

2008/0251418 A1* 10/2008 Francisco .............. C10G 31/00
208/44
2019/0106639 A1* 4/2019 Rovani, Jr. .......... G01N 30/461

* cited by examiner

*Primary Examiner* — Ali Z Fadhel
(74) *Attorney, Agent, or Firm* — Phillips 66 Company (57) ABSTRACT

A process for decreasing contamination of a commercial refining process by vanadyl porphyrins and/or nickel porphyrins by allowing rapid screening of porphyrins directly from asphaltenes isolated from crude oil without enrichment by use of positive-ion electrospray ionization mass spectrometry (ESI MS). Sodium formate is utilized as a ESI spray modifier. The vanadyl porphyrins are detected predominantly as sodiated species, while nickel porphyrins are observed as both sodiated species and molecular ions. Crude oil feedstocks exceeding a defined threshold concentration of vanadyl porphyrins and/or nickel porphyrins are rejected or diluted prior to utilization as refinery feedstock. Certain embodiments additionally quantitate both deoxophylloerythroetioporphyrins and etioporphyrin content (and their ratio) to predict crude oil thermal maturity.

10 Claims, 10 Drawing Sheets

Figure 1.

Vanadium octaethylporphyrin oxide

Nickel octaethylporphyrin

DECREASING THE ADVERSE EFFECTS OF NICKEL AND VANADYL PORPHYRINS IN PETROLEUM REFINING

CROSS-REFERENCE TO RELATED APPLICATIONS

This application is a non-provisional application which claims the benefit of and priority to U.S. Provisional Application Ser. No. 63/216,772 filed Jun. 30, 2021, entitled "Decreasing the Adverse Effects of Nickel and Vanadyl Porphyrins in Petroleum Refining," which is hereby incorporated by reference in its entirety.

STATEMENT REGARDING FEDERALLY SPONSORED RESEARCH OR DEVELOPMENT

None.

FIELD OF THE INVENTION

The present invention relates to processes for decreasing the adverse effects of petroporphyrins on the commercial refining of petroleum, including increased coking rate, increased metal deposition rate and increased catalyst deactivation.

BACKGROUND

The porphyrins content of a crude oil is usually determined indirectly in terms of the total nickel and vanadium content by inductively coupled plasma atomic emission spectroscopy. Total nickel and vanadium content is usually present in the range 0-2000 ppm.

The presence of porphyrins in crude oil refinery feedstock have been implicated in stabilizing crude desalter emulsions. Stable emulsions containing water can lead to water carryover to the atmospheric distillation unit resulting in fouling in the preheat trains. As water also heats up and evaporates, it leaves behind deposits which foul preheat and crude furnace heat exchangers. Further, dissolved amines and other soluble species in the water are carried to the top of the atmospheric distillation unit and can also results in increased corrosion rates near the top of the atmospheric distillation unit.

In addition, porphyrins can undergo hydrodemetallization reactions leading to metals deposition, catalyst deactivation and coke promotion. Hydrodemetallization of porphyrins occurs on the hydrotreating catalyst and de-metallization of porphyrins also occurs on fluid catalytic cracking (FCC) catalyst, which results in deposition of nickel and vanadium on such catalysts resulting in deactivation. On hydrotreating catalysts, porphyrins deactivate the catalysts by getting into pores in the catalyst, blocking access of the feed to the catalyst active sites. Nickel porphyrins deactivate FCC catalysts by decomposition into nickel oxide, which promotes dehydrogenation/coking reactions resulting in coke build up on the catalyst, diminishing catalyst activity. Vanadium porphyrins decompose into vanadium tetraoxide and pentaoxide. During regeneration of FCC catalysts these decomposition products migrate to the zeolites and react with oxygen to generate a form of rare earth vanadate that destroys (hydrolyzes) the catalyst's active sites.

Crude oil porphyrins or petroporphyrins are a type of organic heterocycle consisting of a tetrapyrrole core coordinated to vanadium or nickel and may contain alkyl or aromatic side groups together with heteroatoms including oxygen and sulfur.[1-3] The dominant petroporphyrin structures consist of complexes of nickel and vanadium of etioporphyrin (Etio) and deoxophylloerythroetioporphyrin cores.[4-7] They are derived from biologically functional metal complexes such as chlorophyll, heme and related pigments originating from animals, plants, bacteria and algae sedimentary organic matter from which fossil fuels are generated.[8-10] The Petroporphyrins content in crude are commonly used in geochemistry to assess oil lithology, oxidation-reduction conditions, geothermal maturation, conversion of organic matter and burial depth, which are very critical for crude oil production.[11] From a petroleum refining standpoint, porphyrins have been mainly implicated in stabilizing crude desalter emulsions.[12] They also undergo hydrodemetallization reactions, which lead to metals deposition, catalyst deactivation, and coke promotion.[13-15] The ability to screen for these compounds has implications in crude oil selection and for developing effective approaches for demetallization and overall crude management.

Mass spectrometry (MS)-based techniques have been shown to be most reliable for determining the molecular composition fingerprint of porphyrins from complex crude oil matrices.[6, 7, 11, 16-24] MS techniques require that neutral porphyrin molecules be converted into charged species in the gas phase prior to detection. Porphyrins can be ionized by either electron abstraction, proton addition or cationization by use of vacuum and atmospheric pressure ionization techniques such as electron ionization[16, 17] electrospray ionization[6, 18, 23, 24] and atmospheric pressure photoionization.[19-22] The selectivity and sensitivity for generating each type of ion from complex crude oil mixtures largely depends on the porphyrin core structure which may consist of either a nickel or vanadium core.

MS detection of porphyrins from crude oils or asphaltenes typically requires enrichment.[6, 16-24] Direct analysis of unfractionated petroleum heavy fractions enriched by those species can also be performed but require ultrahigh mass spectrometry resolving power to enable deconvolution of porphyrins responses.[7] Various protocols, some of which involved extensive separation, enrichment and purification approaches have been developed to facilitate mass spectrometry identification of porphyrins.[6, 16-24] In this work, positive-ion ESI MS in the presence of sodium formate as a solvent modifier is presented as a rapid approach for screening porphyrins directly from asphaltenes without sample fractionation. The electrospray ionization behavior of the dominant crude oil porphyrin classes was evaluated by use of model compounds including vanadium octaethylporphyrin oxide and nickel octaethylporphyrin, which both have the same base structure. Computational calculations were performed to rationalize the observed ion responses and discrepancies in ionization behaviors of nickel and vanadyl porphyrins by ESI MS. Calculated bond energies resulting from the formation of the different ionized species in the gas phase were used to validate the favorability of sodium attachment for selective and sensitive detection of porphyrins in complex crude oil matrices. The method was applied for screening porphyrins from asphaltenes from three different crude oils, which provided molecular composition fingerprints enabling reliable determination of DPEP and Etio porphyrins contents and ratio.

Accordingly, a need exists for an improved mass spectroscopy method that allows accurate characterization of vanadyl porphyrins from crude oil without purification or enrichment, thereby enabling the rapid identification of potential crude oil feedstocks containing a level of such porphyrins that may cause an increased rate of coking, metal deposition and/or catalyst deactivation if used as feedstock for a commercial petroleum refining process.

BRIEF SUMMARY OF THE DISCLOSURE

Certain embodiments comprise a process for producing a liquid transportation fuel in a commercial petroleum refinery, comprising: a) preparing an asphaltene sample from a crude oil feed stock comprising unrefined petroleum by mixing an aliquot of the crude oil feeds stock with a solvent comprising a C5-C7 hydrocarbon solvent for a period of time, then separating a liquid phase comprising the C5-C7 hydrocarbon solvent plus extracted crude oil compounds from remaining solids, wherein the remaining solids comprise the asphaltene sample; b) dissolving a portion of the asphaltene sample in a solubilizing solvent to produce solubilized asphaltenes and analyzing the dissolved asphaltenes by electrospray ionization mass spectrometry to produce mass spectra data, wherein the sample is contacted with an electrospray modifier comprising sodium prior to the analyzing; c) examining features in the mass spectra data that collectively predict the concentration of porphyrins in the sample to determine a concentration of porphyins in the crude oil feed stock; d) comparing the concentration of porphyrins in the sample crude oil feed stock to a predetermined threshold concentration to determine whether the concentration of porphyrins is equal to or greater than the threshold concentration; e) refining the crude oil feed stock in a petroleum refinery to produce at least one liquid transportation fuel when the concentration of porphyrins is less than the threshold concentration, and not refining the crude oil feed stock in a petroleum refinery to produce at least one liquid transportation fuel when the concentration of porphyrins is equal to or greater than the threshold concentration.

In certain embodiments, the crude oil feed stock is diluted by mixing with a quantity of crude oil comprising a concentration of porphyrins that is less than the threshold concentration when the concentration of porphyrins in the crude oil feedstock is equal to or greater than the threshold concentration, to produce a mixed crude oil feedstock comprising a porphyrin concentration that is less than the threshold concentration, wherein the mixed crude oil feed stock is refined in a petroleum refinery to produce at least one liquid transportation fuel.

In certain embodiments, the crude oil feed stock is mixed with a passivating agent when the concentration of porphyrins in the crude oil feedstock is equal to or greater than the threshold concentration to produce a passivated crude oil feedstock that is refined in a petroleum refinery to produce at least one liquid transportation fuel.

In certain embodiments, the electrospray modifier is sodium formate.

In certain embodiments, porphyrins in the dissolved asphaltenes are not enriched purified or concentrated prior to the analyzing.

In certain embodiments, the C5-C7 hydrocarbon solvent is selected from pentane and heptane In certain embodiments, the solubilizing solvent is selected from benzene and toluene.

In certain embodiments, examining features in the mass spectra data collectively predicts the concentration of vanadium porphyrins in the sample to determine a concentration of vanadium porphyrins in the crude oil feed stock.

In certain embodiments, examining features in the mass spectra data collectively predicts the concentration of nickel porphyrins in the sample to determine a concentration of nickel porphyrins in the crude oil feed stock.

BRIEF DESCRIPTION OF THE DRAWINGS

A more complete understanding of the present invention and benefits thereof may be acquired by referring to the follow description taken in conjunction with the accompanying drawings in which.

The invention is susceptible to various modifications and alternative forms, specific embodiments thereof are shown by way of example in the drawings. The drawings may not be to scale. It should be understood that the drawings are not intended to limit the scope of the invention to the particular embodiment illustrated.

DETAILED DESCRIPTION

Commercial petroleum refineries have a varying abilities to manage nickel and vanadium metals when upgrading petroleum. Some refineries are equipped only to run "light sweet crudes", which according to the New York Mercantile Exchange are crudes with a nickel content of 8 ppm or less and vanadium content of 15 ppm or less.

Other refineries have incorporated additional processes to remove/and/or passivate these metals. For example, in hydrotreating of heavy feeds that contain porphyrins, a refinery often will comprise a sacrificial guard bed that traps and removes porphyrins that may be present in the crude oil feedstock, thereby preventing them from contacting and deactivating the active hydrotreating catalyst bed.

In fluidized catalytic cracking (FCC) units, porphyrins are often "neutralized" by a process called passivation. Ni may be passivated by addition of alumina, which forms nickel aluminate that is no longer active in dehydrogenation of the feed to form coke. Vanadium is passivated by addition of rare earth and/or magnesium oxide, which forms a complex that is no longer active at hydrolyzing the catalysts active sites. Other Ni/V passivation agents include antimony, boron etc.

Regardless, for each refinery there is a threshold concentration of nickel and/or vanadium in a crude oil feedstock that if exceeded would cause problems for the refinery that may include (but are not limited to) increased coking rate, increased metal deposition rate and increased catalyst deactivation inside the refinery.

For certain embodiments, the threshold concentration of nickel may be any number in in the range from 1-2000 ppm. In certain embodiments, the threshold concentration of nickel is a value in the range from 1-150 ppm. In certain embodiments, the threshold concentration of nickel is a value in the range from 1-50 ppm. In certain embodiments, the threshold concentration of nickel is a value in the range from 1-25 ppm. In certain embodiments, the threshold concentration of nickel is a value in the range from 1-15 ppm. In certain embodiments, the threshold concentration of nickel is a value in the range from 1-8 ppm. In certain embodiments, the threshold concentration of nickel is 8 ppm.

For certain embodiments, the threshold concentration of vanadium may be any number in in the range from 1-2000 ppm. In certain embodiments, the threshold concentration of vanadium is a value in the range from 1-250 ppm. In certain embodiments, the threshold concentration of vanadium is a value in the range from 1-50 ppm. In certain embodiments, the threshold concentration of vanadium is a value in the range from 1-25 ppm. In certain embodiments, the threshold concentration of vanadium is a value in the range from 1-15 ppm. In certain embodiments, the threshold concentration of vanadium is 15 ppm.

Porphyrins are also well-known biomarkers of crude oil thermal maturity, among other properties,[5, 28] which makes it important to deploy rapid and reliable techniques for their identification and characterization in crude oil matrices. In this report, positive-ion ESI MS in the presence of sodium formate solvent modifier is presented as a rapid approach for screening porphyrins directly from asphaltenes without sample prefractionation. This approach enables the selective and sensitive detection of vanadyl porphyrins predominantly as sodiated species. The selectivity and sensitivity of the approach was validated by computational calculations, which showed that sodium attachment was the most favored ionization channel for detecting presence of porphyrins compared to protonation or electron abstraction. The method was applied for screening porphyrins from asphaltenes from three different crude oils, which provided molecular composition fingerprints enabling reliable determination of DPEP and Etio porphyrins contents and ratios important for assessing crude oil thermal maturity.

Figure 1:
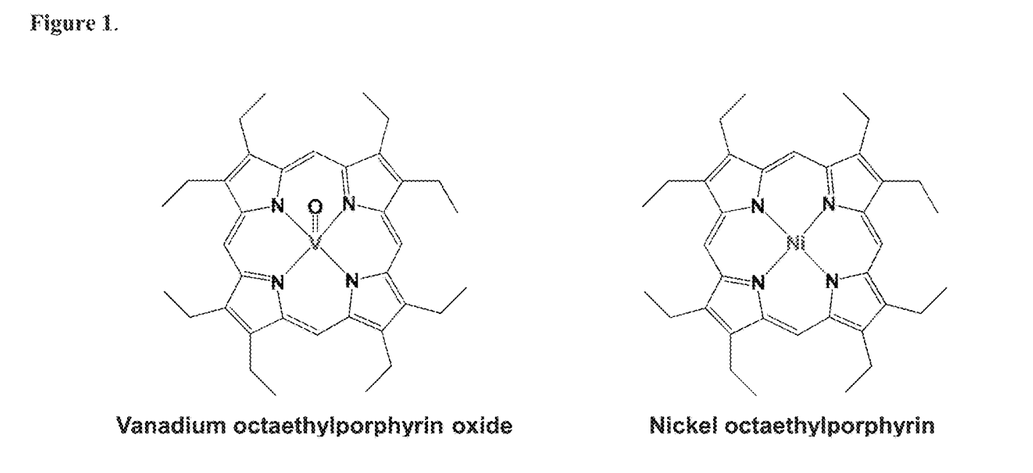
FIG. 1 is diagram showing chemical structures of porphyrin model compounds used for optimization experiments.
Figure 2:
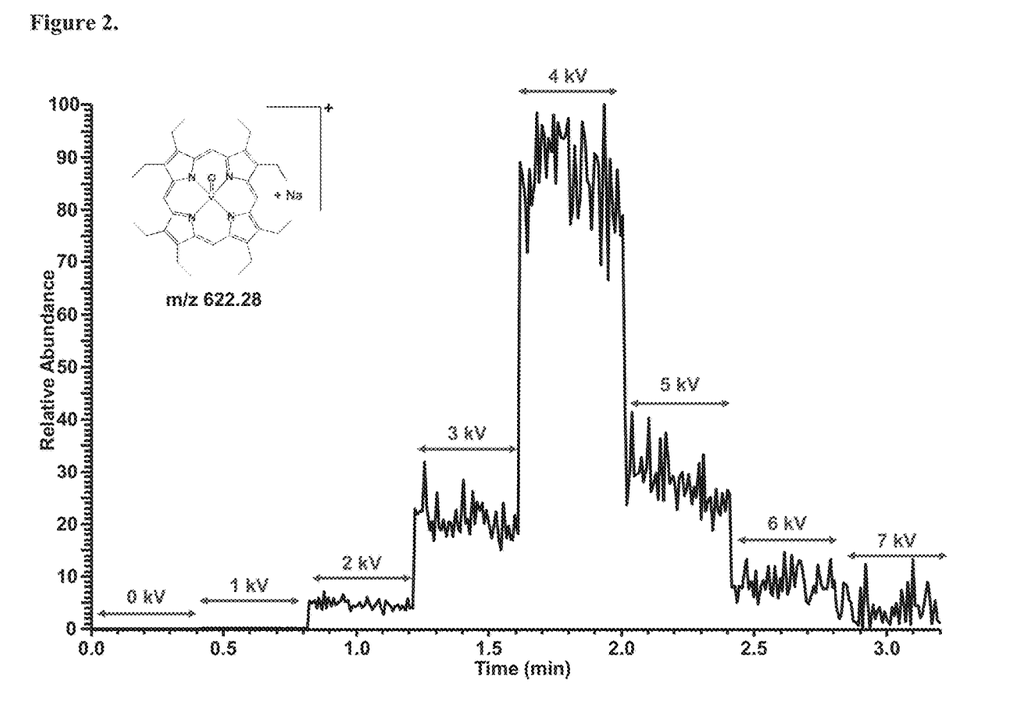
FIG. 2 is a total ion chronogram with varying positive-ion electrospray voltages from analysis of a 1 µM vanadium octaethylporphyrin oxide solution spiked with 10 µM sodium formate.
Figure 3:
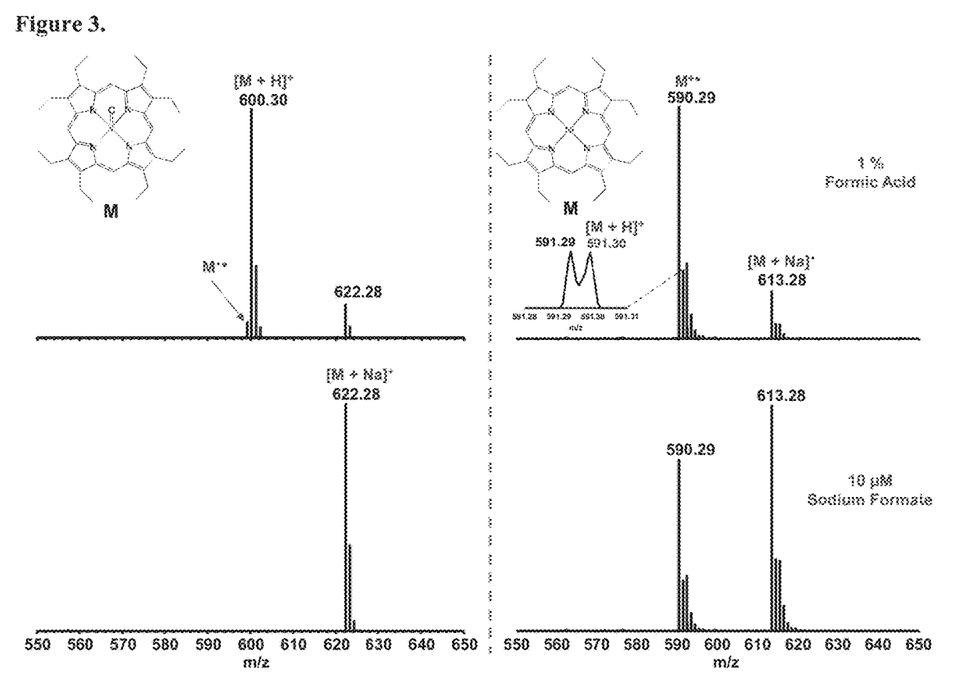
FIG. 3 is a Positive-ion ESI mass spectra of 1 µM porphyrin model compounds: (Left) vanadium octaethylporphyrin oxide; (right) nickel octaethylporphyrin. For each porphyrin, the electrospray solution was individually spiked with various modifiers prior to analysis including: (top) 1% formic acid, and (bottom) 10 µM sodium formate.

Porphyrins ESI MS Response:

The electrospray ionization behavior of the dominant crude oil porphyrin classes was evaluated by use of model compounds including vanadium octaethylporphyrin oxide and nickel octaethylporphyrin, which both have the same base structure (FIG. 1). Experiments were performed by doping an optimized 10× excess of sodium formate to porphyrin in the electrospray spray solvent which consisted of 50:50 methanol:toluene. The most critical parameter that determined the porphyrin response was the electrospray voltage, resulting in an optimum of 4 kV for detection of sodiated vanadium octaethylporphyrin oxide (FIG. 2). Analysis of vanadium octaethylporphyrin oxide by use of conventional electrospray ionization in which the spray solvent is doped with formic acid shows peaks corresponding to protonated molecule, sodiated species and molecular ion, with decreasing response magnitude in that order (FIG. 3, top left). Detection of sodiated species is presumably due to presence of trace amounts of sodium cation impurity in the spray solvents or formic acid modifier. The multiple ionization paths available for vanadium octaethylporphyrin oxide under those conditions, which distributes the analyte response into three channels complicates the mass spectrum resulting in a diminished overall detection limit. However, similar analysis with a 10× excess sodium formate modifier in the spray solution results in a simple spectrum dominated exclusively by responses corresponding to sodiated vanadium octaethylporphyrin oxide (FIG. 3, bottom left). The lumping of analyte responses due to availability of predominately one ionization path under those conditions results in an overall improved detection limit and selectivity for detection of vanadium porphyrins.

Analysis of nickel octaethylporphyrin by use of formic acid spray solution also results in three different ionization paths, dominated by peaks corresponding to molecular ions, together with the protonated molecule and sodiated species (FIG. 3, top right). Similar analysis with 10× excess sodium formate modifier generates a similar spectrum with a slightly higher response for the sodiated species compared to the molecular ions. The significantly high response for the molecular ion even with an excess amount of sodium cations in the spray solution suggests a lower sodium cation affinity for nickel porphyrins compared to vanadyl porphyrins. The distribution of the ion response into multiple channels suggests the sodium formate modifies doesn't enhance the response or selectivity for detecting nickel porphyrins. Overall, these data indicate that ESI analysis of petroporphyrins with formic acid modifier generates predominantly protonated molecules for vanadyl porphyrins and molecular ions for nickel porphyrin. With sodium formate modifier, vanadyl porphyrins are detected mainly as sodiated species and nickel porphyrins as molecular ions and sodiated species.

Figure 4:
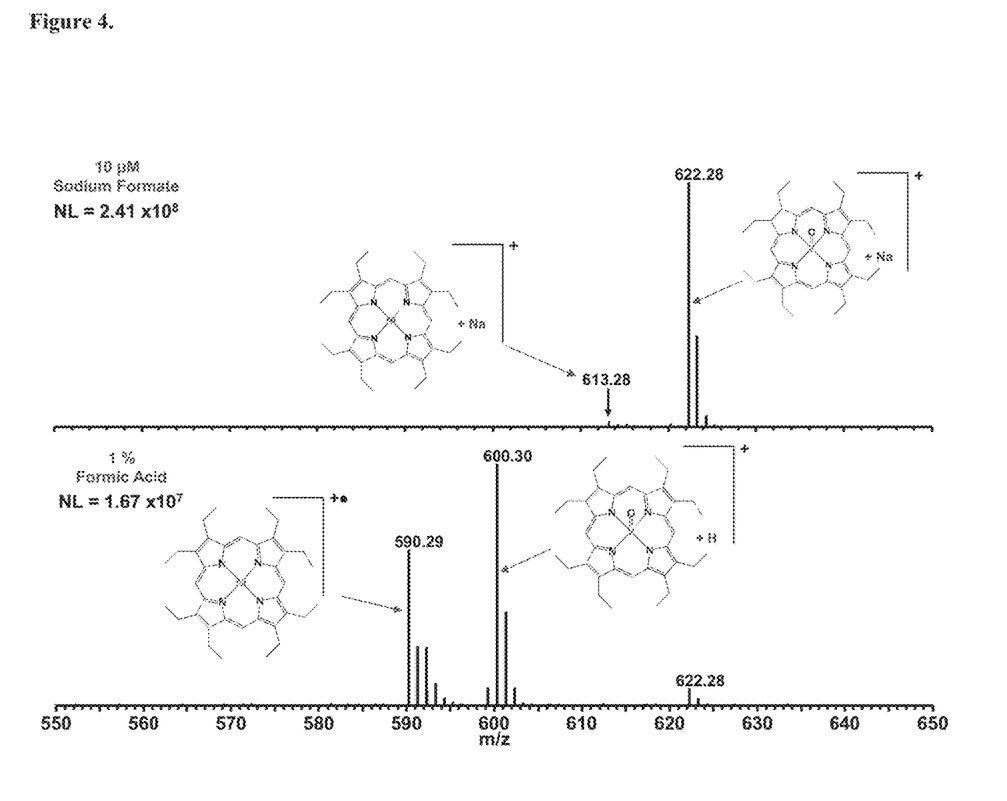
FIG. 4 is analysis of an equimolar mixture (0.5 µM ea.) of vanadium octaethylporphyrin oxide and nickel octaethylporphyrin by positive-ion ESI with the spray solvent spiked with: (Top) 10 µM sodium formate; (bottom) 1% formic acid.

The relative response of nickel and vanadium porphyrins with the use of sodium formate modifier ESI approach was further evaluated by analysis of an equimolar mixture of nickel octaethylporphyrin and vanadium octaethylporphyrin oxide (FIG. 4). The Vanadyl porphyrin showed a significantly greater response (~ 50×) compared to the nickel porphyrins indicating a relatively high sensitivity and selectivity of this approach for detecting vanadyl porphyrins. Overall, the high porphyrins ion response and selectivity with sodium formate ESI modifier suggests that approach to show superior performance for determining the presence and distribution of porphyrins in complex organic mixtures. FIG.

Figure 5:
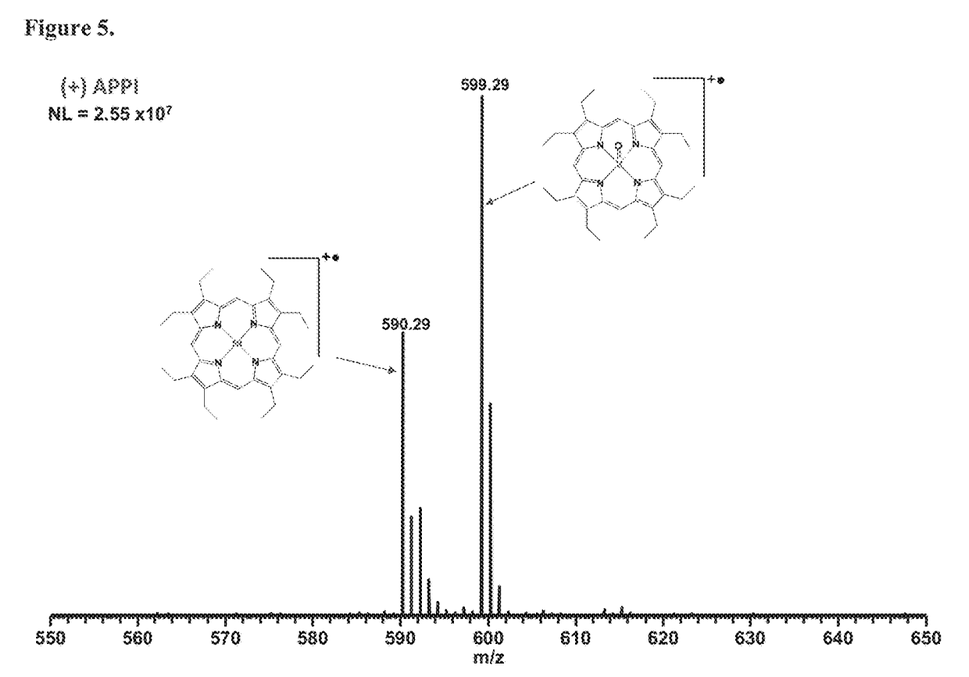
FIG. 5 is Analysis of an equimolar mixture (0.5 µM ea.) of vanadium octaethylporphyrin oxide and nickel octaethylporphyrin by positive-ion APPI MS.

4, bottom presents a comparison of the ionization behavior of the same porphyrins equimolar mixture via conventional ESI with formic acid spray modifier. Both porphyrins models show overall similar response magnitude, however, while nickel porphyrin is detected predominantly as the molecular ion, vanadyl porphyrin is detected as the protonated molecule. The similarity is response, which indicates a low analysis selectivity suggests the formic acid modifier ESI approach could be more useful for simultaneous detection of nickel and vanadyl porphyrins in complex mixtures. The same is true for analysis of porphyrins by use of atmospheric pressure photoionization, in which both nickel and vanadyl porphyrins are both observed predominantly as molecular ions generated by charge exchange (FIG. 5). The protonation and charge exchange ionization channels of conventional ESI and APPI are also available to other basic and low energy ionizing species that compete for charge which suppress ionization of petroporphyrin.[18] Overall the sodium formate modifier ESI approach shows an order of magnitude greater response (NL=$2.41 \times 10^8$) compared to the formic acid modifier approach (NL=$1.67 \times 10^7$) and APPI (NL=$2.55 \times 10^7$), indicating the former to be most sensitive for determining the distribution of porphyrins in crude oil. These data also show that nickel porphyrins generally have lower ionization response compared to vanadyl porphyrins[20] but can be most readily detected by either conventional ESI or APPI. However, their overall lower concentration in crude oils compared to vanadyl porphyrins[20, 23] makes them harder to detect without enrichment.

Porphyrins Ionization Energetics

Computational calculations were performed to rationalize the observed ion responses and discrepancies in ionization behaviors of nickel and vanadyl porphyrins by ESI MS. Structural changes and stabilization interactions that occur when Ni(II) and V(IV) porphyrin compounds are ionized to generate molecular ions, protonated molecules and sodiated species were evaluated. Calculated bond energies resulting from the formation of the different ionized species in the gas phase were used to compare the relative favorability of the different ionization channels to form the petroporphyrin ions.

Figure 6:
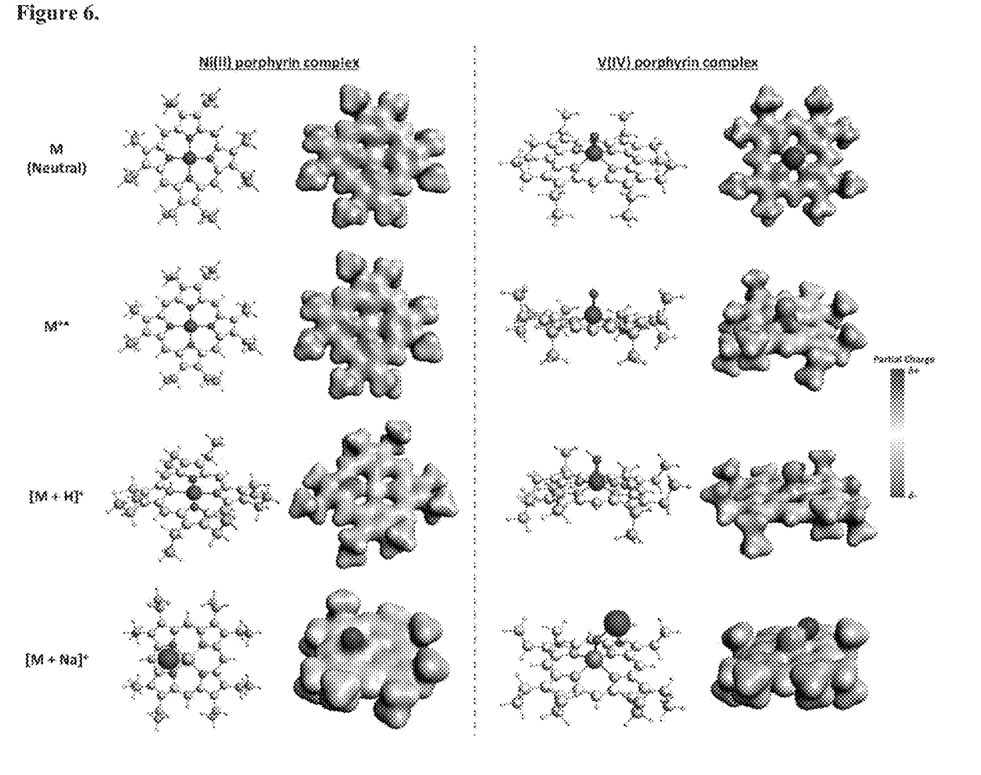
FIG. 6 is a geometry optimized DFT model depicting the molecular structure, which highlights the Hirsfield charge per atom for Ni(II) porphyrin and V(IV) porphyrin complexes and their corresponding electrostatic potential maps: (top row) Neutral molecules, (top-middle row) molecular ions, (bottom-middle row) protonated species; (bottom) sodiated species. Atoms with partial positive charge appear blue and atoms with partial negative charge appear red.
Figure 7:
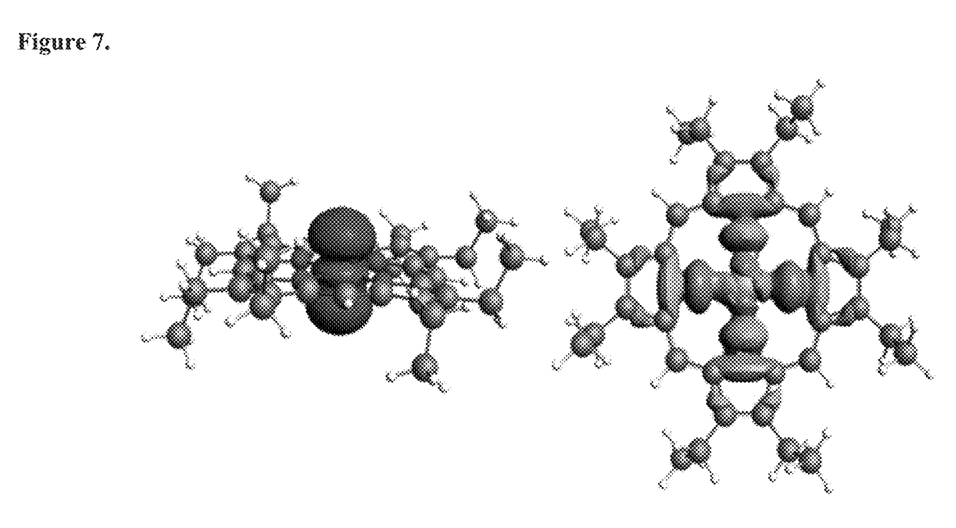
FIG. 7 shows two 3D molecular models, (Left) calculated HOMO for Ni (II) porphyrin complex; (right) calculated LUMO for the Ni (II) porphyrin complex.

The structure of the neutral nickel(II) porphyrin and the associated Hirsfield charge per atom shows the expected planar configuration, in which the pyrrole groups are equivalent in terms of symmetry and coordination to the nickel(II) ion (FIG. 5, top left-left). In that configuration, the porphyrin structure delocalizes electron density across the aromatic structure and is strongly coordinating the metal ion via bonds with the nitrogen group in the pyrrole. The nickel (II) metal atom with two electrons removed is the most electropositive atom in the molecule. The rest of the organic structure has similar charge since the C—H bonds have relatively low polarization and are covalent in nature. In contrast, the four nitrogen atoms in the porphyrin concentrate much of the negative charge since they equally split a double negative charge. The electrostatic potential map also shows that the nitrogen atoms in the porphyrin structure have the highest electrostatic potential in the structure (FIG. 6, top left-right). The highest occupied molecular orbital (HOMO) of the Ni(II) porphyrin complex lies center on the Ni(II) ion and is made up largely of the $dz^2$ atomic orbital (FIG. 7, left). In contrast, the lowest unoccupied molecular orbital (LUMO) is primarily composed of antibonding character between the nitrogen-nickel coordination bonds (FIG. 7, right). Both molecular orbitals are centered around the core of the porphyrin structure. As such, removal of electrons from the HOMO will likely originate from the nickel metal ion and will impact the symmetry of the nickel-nitrogen bonds.

Figure 8:
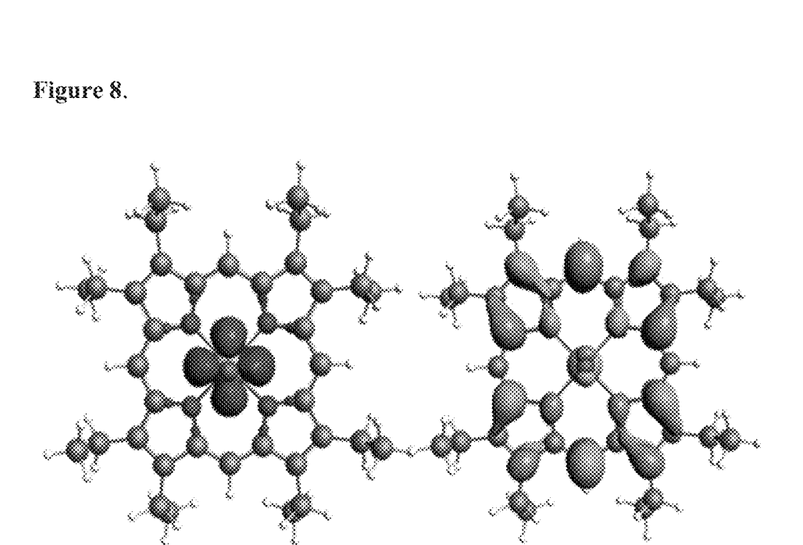
FIG. 8 shows two 3D molecular models, (Left) calculated HOMO for V(IV) porphyrin complex; (right) calculated LUMO for the V (IV) porphyrin complex.

FIG. 6, top right-left shows the geometry optimized structure of vanadium (IV) porphyrin and the associated Hirsfield charge per atom. Unlike the nickel (II) porphyrin, the structure of the oxovanadium moiety is not planar but is off the plane of the porphyrin ligand. The optimized structure shows that the coordination around the metal center is tetrahedral with a vanadium-oxygen bond length of 1.595 Å, indicating a bond order comparable to a vanadium-oxygen double bond. The presence of a vanadium-oxygen double bond suggests that to accommodate the (IV) oxidation state in vanadium, the ancillary ligand must be an oxo-type ligand. The oxo-ligand partial charge is much more negative than the nitrogen in the pyrrole units meanwhile the vanadium cation is the main source of positive charge. In contrast with the nickel (II) porphyrins that did not feature ancillary ligands, the vanadium (IV) porphyrin has a highly polarized vanadium-oxygen bond. Also, the electrostatic potential map (FIG. 6, top right-right) shows that the region with the highest negative potential density occurs at the oxo ligand, which is higher than the pyrrole nitrogen atoms which are typically sources of electron density. In terms of electronic structure, the V(IV) porphyrin has an unpaired electron due to the V(IV) metal cation electronic configuration ([Ar]3d1). Similar to the Ni(II) porphyrin, the calculation shows that the HOMO lies centered on the vanadium cation (FIG. 8, left). This orbital is also partially filled since the ground state of this complex is a doublet due to the unpaired electron. The LUMO on the other hand is centered on the porphyrin ligand and is delocalized across the different pyrrole units (FIG. 8, right). This result indicates that removal of an electron to create a positively charged metal-porphyrin complex will likely come from the vanadium(IV) center resulting in further oxidation to vanadium (V).

The energies required to go from a neutral porphyrin metal complex [M-Porphyrin]0 in the gas phase to a cationic species such as those observed by ESI MS to generate molecular ions, protonated molecules and sodiated species are listed in Table 1 for [M-Porphyrin]+ for both nickel and vanadium porphyrins.

TABLE 1

Calculated energies to generate gas phase molecular ions (electron abstraction), protonated molecules (proton addition) or sodiated species (sodium cation addition) for two types of porphyrin metal complexes, such as those observed by ESI MS.

| Metalloporphyrin | Electron removal (kJ/mol) | Proton addition (kJ/mol) | Sodium cation addition (kJ/mol) |
|---|---|---|---|
| Ni(II)Porphyrin | 618.3 | −969.6 | −198.2 |
| V(IV)Porphvrin | 637.5 | −984.2 | −230.1 |
| ΔNi − V* | −19.2 | 14.6 | 31.9 |

*Energy difference between Ni(II)-Porphyrin and V(IV)-Porphyrin. Positive values indicate that the energetic differences for the ionization channel favor ionization of the V(IV) porphyrin over the Ni(II) porphyrin. The negative value indicates that ionization of the Ni(II) porphyrin is the energetically favored over the V(IV) porphyrin.

The relative differences in energy for the Ni(II) and V(IV) porphyrins of each ionization channel are calculated. The results show that ionization by electron abstraction to generate a molecular ion is more favorable for Ni(II) porphyrin compared to V(IV) porphyrin (Table I), which is consistent with the abundant molecular ions response observed for Ni(II) porphyrin with both formic acid and sodium formate modifiers (FIG. 3). This favorability is likely because removal of an electron from the Ni(II) porphyrin does not significantly change the structure of the complex as shown by the Hirsfield structure and electrostatic potential map (FIG. 6, top-middle left). On the other hand, removal of an electron from the V(IV) porphyrin is accompanied by a large change in the geometry of the structure into a puckered state (FIG. 6, top-middle right).

Unlike electron abstraction, proton addition and sodium cation addition favor ionization of the V(IV) porphyrin over the Ni(II) porphyrin. This is because the vanadium porphyrin has a strong polarized oxo ligand that serves as an electron rich moiety that can interact strongly with cationic species such as the proton or sodium ions as shown by the Hirsfield structures and electrostatic potential energy maps for the protonates and sodiated porphyrins (FIG. 6, bottom-middle row and bottom row). The strong interaction between the oxo-ligand in V(IV) porphyrin and a protons or sodium ion stabilizes the formation of the cation-porphyrin complex leading to lower ionization energies. In comparison, the nickel porphyrin does not have this interaction and therefore cannot stabilize the interaction between sodium and proton hard cations resulting in higher energy for that ionization channel. The energy difference between cationized Ni(II) porphyrins and V(IV)-porphyrin is greatest for the sodiated species suggesting a high sensitivity and selectivity for detecting vanadyl porphyrins, consistent with the ESI MS measurements (FIG. 4). The favorability of the ionization channels for vanadyl porphyrins over nickel porphyrin increases in the order sodium cation attachment>protonation>electron removal. The reverse is true for the favorability of nickel porphyrins over vanadyl porphyrins (Table 1).

Sodium Cationization Applied to Screening Crude Oil Porphyrins

Figure 9:
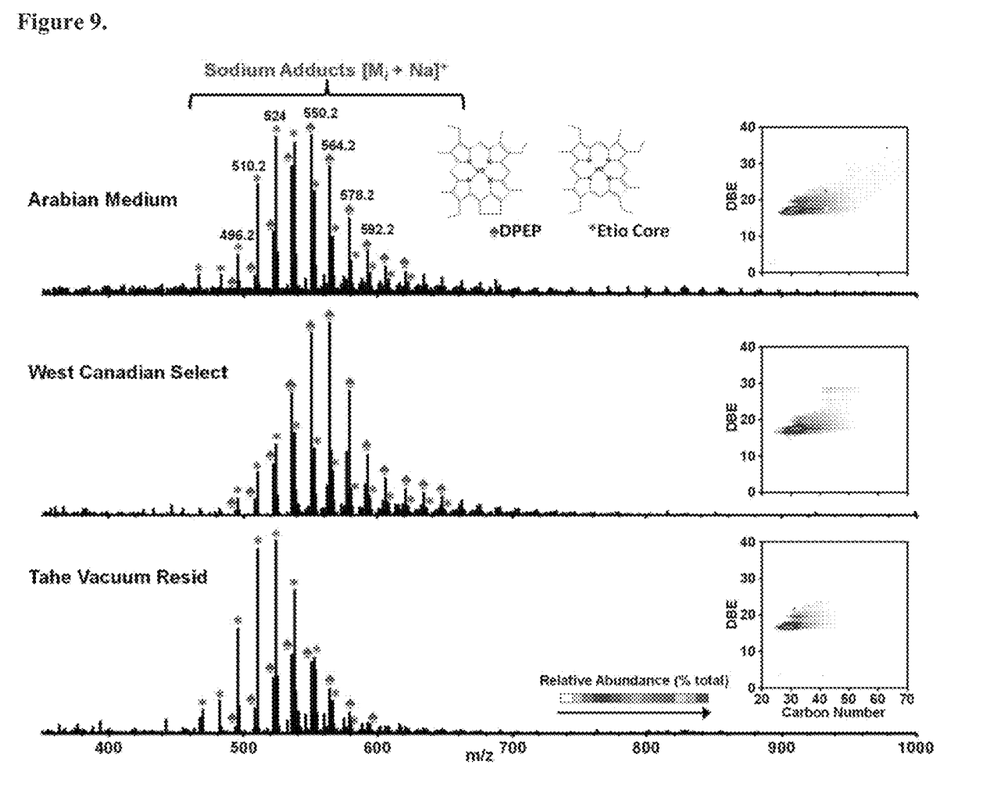
FIG. 9 is a positive-ion ESI mass spectra of various asphaltenes with the spray solution spikes with 10 µM sodium formate: (top) Arabian medium, (middle) West Canadian Select, (bottom) Tahe. The spectra are dominated by sodiated porphyrins. The inset in each plot shows the isoabundance-contour plots of DBE versus carbon number for the NaN4O1V1 class corresponding to sodiated porphyrins.
Figure 10:
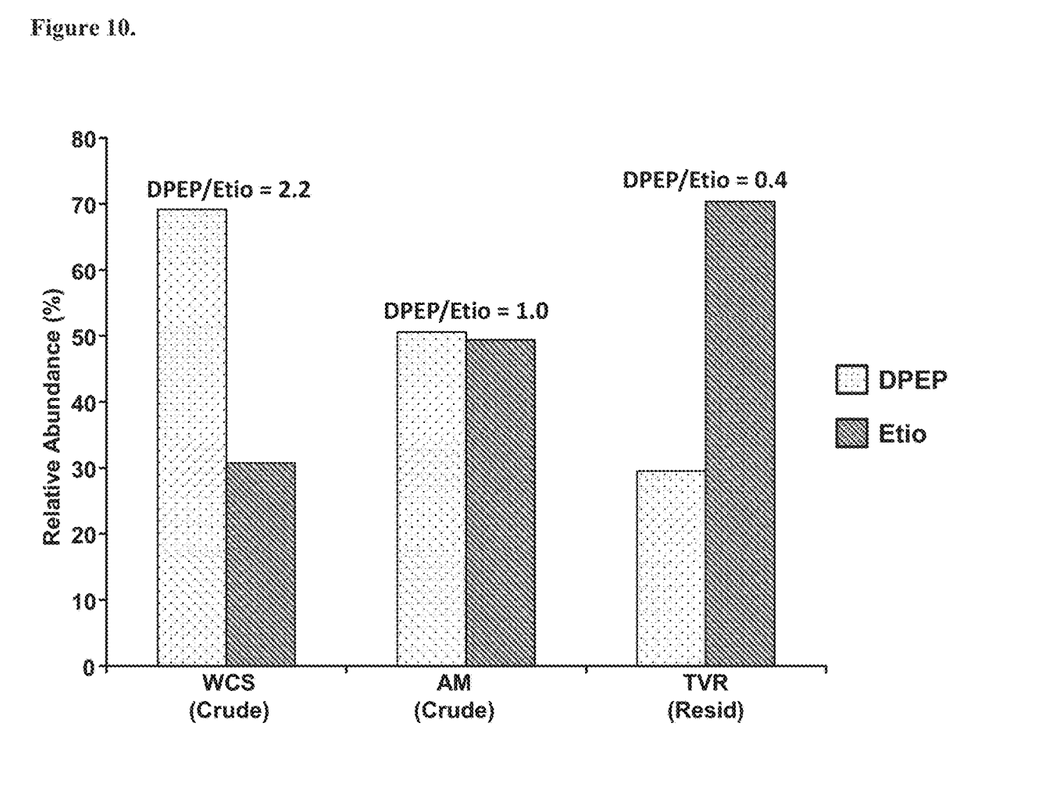
FIG. 10 is a bar graph showing the relative abundance of DPEP and Etio porphyrins in various asphaltenes from positive-ion electrospray ionization mass spectrometry. The porphyrins were detected as sodium adducts.

In addition to their high propensity for stabilizing crude emulsions, porphyrins undergo hydrodemetallization reactions, which lead to metals deposition, catalyst deactivation, and coke promotion in refinery operations.[13-15] Those processing issues make it desirable to deploy a rapid screening approach for determination of porphyrins for crude oil selection applications and for developing protocols for their effective demetallization. MS detection of porphyrins from crude oils or asphaltenes typically requires enrichment. In this work, positive-ion ESI MS in the presence of sodium formate as a solvent modifier was used as a rapid approach for screening porphyrins directly from asphaltenes without any sample fractionation. FIG. 9 shows the application of the approach for analysis of whole asphaltenes samples from three different crude oils. The spectra are dominated by peaks corresponding to sodiated vanadyl porphyrins, with the most abundant species consisting of the DPEP and Etio cores. The inset in each plot shows the DBE versus carbon number distribution for the vanadyl porphyrins (NaN4O1V1 class) distribution. The plots show similar fingerprints as those observed by positive-ion APPI,[19-22] in which porphyrins were detected predominantly as molecular ions. This approach allows selective and sensitive detection of porphyrins, which are biomarkers of crude oil thermal maturity. Full maturity is characterized by a low DPEP content because thermal stress creates Etio at the expense of the DPEP series.[27] As such, thermal maturity is commonly determined by the DPEP/Etio porphyrins ratio, which increases with a decrease in that ratio.[27] For the three asphaltenes evaluated, their DPEP/Etio ratio varies in the order: TVR (DPEP/Etio=0.4)<AM (DPEP/Etio=1.0)<WCS (DPEP/Etio=2.2) (FIG. 10), which thermal maturity increasing in the order TVR>AM>WCS.

EXAMPLES

The following examples of certain embodiments of the invention are given. Each example is intended to illustrate a specific embodiment, but the scope of the invention is not intended to be limited to the embodiments specifically disclosed. Rather, the scope is intended to be as broad as is supported by the complete disclosure and the appending claims.

All reagents and chemicals were used without additional purification. All solvents used for isolation and dissolution of asphaltenes (pentane, heptane, benzene, methanol and toluene) and electrospray modifiers (formic acid and sodium formate) were high purity grades and purchased from Sigma Aldrich (≥99%, Sigma Aldrich, St. Louis, MO, USA). Porphyrin model compounds including vanadium octaethylporphyrin oxide and nickel octaethylporphyrin were also purchased from Sigma Aldrich. Asphaltenes were isolated from various crude oils and resid including Arabian Medium (AM) crude oil, West Canadian Select (WCS) crude oil, and Tahe vacuum resid (TVR).

Example 1

Isolation of Asphatene: Asphaltene samples were prepared by use of pentane insolubles for Arabian medium and West Canadian select (WCS) crude oils while heptane insolubles followed by soxhlet extraction was used for the Tahe vacuum resids.25 Pentane-insoluble asphaltenes were prepared by mixing pentane with crude in a 25/1 wt/wt ratio. A total of 4 L of pentane was added to 100 g of crude oil by adding the solvent 1 L at a time and stirring for 1 h in between additions until the total volume of pentane was added to the crude oil. The sample was then held overnight for flocculation. The flocculated mixture was vacuum filtered with Whatman #40 filter paper. The material that collected on the filter paper was washed with pentane until the filtrate became colorless. The solid material on the filter was then dried in an oven at 110° C. for 2 h.

Example 2

Asphaltenes from the Tahe vacuum resids were prepared by mixing 1.5 g of vacuum resid with 30 mL of heptane and refluxing the mixture for 1 h. The mixture was then left to equilibrate overnight at ambient temperature. The heptane-insoluble material was soxhlet extracted with n-heptane until the solvent drops were colorless. Benzene was used to dissolve the asphaltenes and the benzene was subsequently evaporated to generate dry asphaltenes.

Example 3

Electrospray Ionization (ESI) MS: Porphyrin model compounds were dissolved in toluene and then diluted to a final concentration of 1 µM in a solution of 50:50 methanol:toluene. Samples were spiked with either 10 µM sodium formate or 1% formic acid prior to analysis, unless stated otherwise. Each asphaltene sample was dissolved in toluene and then diluted to a final concentration of 200 µg/mL with 50:50 toluene:methanol containing 10 µM sodium formate prior to analysis. Samples were infused at a flow rate of 20 µL/min into a heated ESI source (HESI, Thermo Scientific, San Jose California) for generation of ions, which were sampled into the inlet of a high-resolution mass spectrometer for measurement of their m/z. The nitrogen sheath gas, auxiliary, and sweep gas flow rates were 25, 10, and 0 au, respectively. The HESI probe temperature was set at 40° C. The mass spectrometer inlet capillary temperature was set to 300° C. The S lens RF level was set at 60%.

Example 4

Mass analysis was performed with a hybrid linear ion trap orbitrap (Orbitrap Elite, Thermo Scientific, San Jose, California) mass spectrometer. The ion trap mass analyzer was operated with automatic gain control (AGC) set at 30,000 ions and the AGC target for the orbitrap mass analyzer was set at 500,000, with a maximum injection time of 100 ms. Mass analysis was performed in the orbitrap mass analyzer at a resolving power of 120,000. Full scan mass spectra data were acquired with Xcalibur version 2.2.0 software in the m/z 200-1000 range.

Mass analysis was performed with a hybrid linear ion trap orbitrap mass spectrometer (Orbitrap Elite, Thermo Scientific, Sans Jose, CA). The ion trap mass analyzer was operated with automatic gain control (AGC) set at 30,000 ions and the AGC target for the orbitrap mass analyzer was set at 1,000,000 with a maximum injection time of 100 ms. Mass analysis was performed in the orbitrap mass analyzer at a resolving power of 240,000 at m/z 400, unless stated otherwise.

Full-scan mass spectra data were acquired with Xcalibur version 2.2.0 software. Asphaltenes Xcalibur raw data files were converted to Notepad files (.txt) prior to data processing with commercial software (PetroOrg, Florida State University, Tallahassee, FL). Mass spectra recalibration and peaks assignment by the software was performed on the basis of Kendrick mass defect analysis. The data was grouped by heteroatom "class" composition and plotted as color-contour plots of double-bond equivalents (DBE) versus carbon number.

Example 5

Atmospheric Pressure Photoionization (APPI) MS: Porphyrin model compounds were dissolved in toluene to a final concentration of 0.5 µM prior to analysis. Sample introduction to the mass spectrometer was performed by direct flow injection at a flow rate of 100 µL/mL. The flow was directed to a heated nebulizer probe in which the sample was vaporized to generate gas-phase molecules that were subsequently ionized by APPI. The probe temperature was set at 350° C. Nitrogen was used as sheath and auxiliary gas at a flow rate of 60 and 5 au (arbitrary units), respectively. A vacuum ultraviolet (VUV) krypton discharge lamp emitting 10 eV photons (Syagen Technology Inc. Tustin, CA) and mounted on an Ion Max source (Thermo Fisher Scientific) was used to generate analyte ions, which were vacuumed into the inlet of the mass spectrometer. The mass spectrometer capillary inlet temperature and probe temperature were set at 350° C. The S lens RF level was set at 50%. Mass analysis, as well as data acquisition were performed the same way as for ESI.

Example 6

Theoretical methods: Density function theory (DFT) calculations were performed using the Software for Chemistry and Materials (SCM) Amsterdam Density Functional (ADF2019.104) suite on an 18-core workstation (Intel Core i9-9980XE, 3.0 GHz). All molecules are assumed to be in vacuum and in the gas phase. The preoptimization of the structure for organic molecules was done using molecular mechanics with a MM2 force field. The metal complexes were optimized using the exchange correlation functional M06-L as implemented in ADF 2019 which has been proven to be very successful at predicting energetics and structures of metal-organic species.26 For geometry optimizations all electrons were included, and each atomic orbital was modeled using a basis set that contained double-ζ functions and one polarization function to represent the electron density as implemented in the ADF 2019 software suite. For calculations where unpaired electrons exist in the ground state (spin multiplicity is not S=0) of metal complexes, unrestricted spin states were used to allow for each electron to be optimized independently and generate the lowest energy state. Electronic effects arising from the ionization of the porphyrin complexes were studied by calculating the atomic Hirshfeld charges27 on a given porphyrin structure and mapping the electrostatic potential over the surface of the molecule. This map is useful to indicate areas where there is excess electron density (negative charge) or electron deficient areas (positive charge).

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
(1) Dechaine, G. P.; Gray, M. R. *Energy Fuels* 2010, 24, 2795-2808.
(2) Treibs, A. *Ann. Chem.* 1934, 510, 42-62.
(3) Treibs, A. *Angew. Chem.* 1936, 49, 682-686.
(4) Czernuszewicz, R. S. *J. Porphyrins Phthalocyanines* 2000, 4, 426-431.
(5) Barwise, A. J. G. *Energy Fuels* 1990, 4, 647-652.
(6) Zhao, X.; Liu, Y.; Xu, C.; Yan, Y.; Zhang, Y.; Zhang, Q.; Zhao S.; Chung, K.; Gray, M. R.; Shi, Q. *Energy Fuels* 2013, 27, 2874-2882.
(7) McKenna, A. M.; Purcell, J. M.; Rodgers, R. P.; Marshall, A. G. *Energy Fuels* 2009, 23, 2122-2128.
(8) Baker, E. W.; William Louda, J.; Orr, W. L. *Org. Geochem.* 1987, 11, 303-309.
(9) Ocampo, R.; Callot, H. J.; Albrecht, P.; Kintzinger, J. P. *Tetrahedron Lett.* 1984, 25, 2589-92.
(10) Ocampo, R.; Albrechtt, P. *Energy Fuels* 1993, 7, 191-193.
(11) Giraldo-Davila, D.; Chacón-Patiño, M. L.; Ramirez-Pradilla, J. S.; Blanco-Tirado, C.; Combariza; M. Y. *Fuel,* 2018, 226, 103-111.
(12) Lee, R. F. *Spill Sci. Technol Bull.* 1999, 5, 117-126.
(13) Ware, R. A.; Wei, J. *J. J. Catal.* 1985, 93, 100-121.

(14) Kelemen, S. R.; Siskin, M.; Gorbaty, M. L.; Ferrughelli, D. T.; Kwiatek, P. J.; Brown, L. D.; Eppig, C. P.; Kennedy, R. J. *Energy Fuels* 2007, 21, 927-940.

(15) Ali, M. F.; Abbas, S. *Fuel Process. Technol.* 2006, 87, 573-584.

(16) Grigsby, R. D.; Green, J. B. *Energy Fuels* 1997, 11, 602-609.

(17) Ali, M. F.; Perzanowski, H.; Bukhari, A.; Al-Haji, A. A. *Energy Fuels* 1993, 7, 179-184.

(18) Putman, J. C.; Rowland, S. M.; Corilo Y. E.; McKenna, A. M. *Anal. Chem.* 2014, 86, 10708-10715.

(19) McKenna, A. M.; Williams, J. T.; Putman, J. C.; Aeppli, C.; Reddy, C. M.; Valentine, D. L.; Lemkau, K. L.; Kellerman, M. Y.; Savory, J. J.; Kaiser, N. K.; Marshall, A. G.; Rodgers, R. P. *Energy Fuels* 2014, 28, 2454-2014.

(20) Qian, K.; Edwards, K. E.; Mennito, A. S.; Walters, C. C.; Kushnerick, J. D. *Anal. Chem.* 2010, 82, 413-419.

(21) Qian, K.; Mennito, A. S.; Edwards, K. E.; Ferrughelli, D. T. *Rapid Commun. Mass Spectrom.* 2008, 22, 2153-2160.

(22) Rodgers, R. P.; Hendrickson, C. L.; Emmett, M. R.; Marshall, A. G.; Greaney, M. A.; Qian, K. *Can. J. Chem.* 2001, 79, 546-551.

(23) Liu, H.; Mu, J.; Wang, Z.; Ji, S.; Shi, Q.; Guo, A.; Chen, K.: Jincheng Lu, J. *Energy Fuels* 2014, 28, 2454-2014.

(24) Van Berkel, G. J.; McLuckey S. A.; Glish, G. L. *Anal. Chem.* 1991, 63, 1098-1109.

(25) Nyadong, L.; Lai, J.; Thompsen, C.; LaFrancois, C. J.; Cai, X.; Song, C.; Wang, J.; Wang, W. *Energy Fuels* 2018, 32, 294-305.

(26) Zhao, Y.; Truhlar, D. G. *J. Chem. Phys.* 2006, 125, 194101-194118.

(27) Hirshfeld, F. L. *Theor. Chim. Acta* 1977, 44, 129-137.

(28) Dolphin, D. *Acedemic Press Inc* 1978, v. 1, p. 485.

We claim:

1. A process for producing a liquid transportation fuel in a commercial petroleum refinery, comprising:
    a) preparing an asphaltene sample from a crude oil feed stock comprising unrefined petroleum by mixing an aliquot of the crude oil feeds stock with a solvent comprising a C5-C7 hydrocarbon solvent for a period of time, then separating a liquid phase comprising the C5-C7 hydrocarbon solvent plus extracted crude oil compounds from remaining solids, wherein the remaining solids comprise the asphaltene sample;
    b) dissolving a portion of the asphaltene sample in a solubilizing solvent to produce solubilized asphaltenes and analyzing the dissolved asphaltenes by electrospray ionization mass spectrometry to produce mass spectra data, wherein the sample is contacted with an electrospray modifier comprising sodium prior to the analyzing;
    c) examining features in the mass spectra data that collectively predict the concentration of porphyrins in the sample to determine a concentration of porphyins in the crude oil feed stock;
    d) comparing the concentration of porphyrins in the sample crude oil feed stock to a predetermined threshold concentration to determine whether the concentration of porphyrins is equal to or greater than the threshold concentration; and
    e) refining the crude oil feed stock in a petroleum refinery to produce at least one liquid transportation fuel when the concentration of porphyrins is less than the threshold concentration, and not refining the crude oil feed stock in a petroleum refinery to produce at least one liquid transportation fuel when the concentration of porphyrins is equal to or greater than the threshold concentration.

2. The process of claim 1, wherein the crude oil feed stock is diluted by mixing with a quantity of crude oil comprising a concentration of porphyrins that is less than the threshold concentration when the concentration of porphyrins in the crude oil feedstock is equal to or greater than the threshold concentration, to produce a mixed crude oil feedstock comprising a porphyrin concentration that is less than the threshold concentration, wherein the mixed crude oil feed stock is refined in a petroleum refinery to produce at least one liquid transportation fuel.

3. The process of claim 1, wherein the crude oil feed stock is mixed with a passivating agent when the concentration of porphyrins in the crude oil feedstock is equal to or greater than the threshold concentration to produce a passivated crude oil feedstock that is refined in a petroleum refinery to produce at least one liquid transportation fuel.

4. The process of claim 3, wherein the passivating agent binds to at least one of nickel and vanadium.

5. The process of claim 1, wherein the electrospray modifier is sodium formate.

6. The process of claim 1, wherein porphyrins in the dissolved asphaltenes are not enriched purified or concentrated prior to the analyzing.

7. The process of claim 1, wherein C5-C7 hydrocarbon solvent is selected from pentane and heptane.

8. The process of claim 1, wherein the solubilizing solvent is selected from benzene and toluene.

9. The process of claim 1, wherein examining features in the mass spectra data collectively predicts the concentration of vanadium porphyrins in the sample to determine a concentration of vanadium porphyrins in the crude oil feed stock.

10. The process of claim 1, wherein examining features in the mass spectra data collectively predicts the concentration of nickel porphyrins in the sample to determine a concentration of nickel porphyrins in the crude oil feed stock.

* * * * *